(12) United States Patent
Dilmore et al.

(10) Patent No.: US 7,842,126 B1
(45) Date of Patent: Nov. 30, 2010

(54) $CO_2$ SEPARATION FROM LOW-TEMPERATURE FLUE GASES

(75) Inventors: Robert Dilmore, Irwin, PA (US); Douglas Allen, Salem, MA (US); Yee Soong, Monroeville, PA (US); Sheila Hedges, Bethel Park, PA (US)

(73) Assignee: The United States of America as represented by the United States Department of Energy, Washington, DC (US)

( * ) Notice: Subject to any disclaimer, the term of this patent is extended or adjusted under 35 U.S.C. 154(b) by 267 days.

(21) Appl. No.: 12/241,430

(22) Filed: Sep. 30, 2008

(51) Int. Cl.
*B01D 53/14* (2006.01)
*B01D 53/62* (2006.01)

(52) U.S. Cl. ............ 95/195; 95/205; 423/225; 423/232

(58) Field of Classification Search .......... 95/189, 95/195–197, 205, 236; 423/220, 225, 226, 423/228, 229, 232
See application file for complete search history.

(56) References Cited

U.S. PATENT DOCUMENTS

| | | | |
|---|---|---|---|
| 6,387,337 B1 | 5/2002 | Pennline et al. | |
| 6,547,854 B1 | 4/2003 | Gray et al. | |
| 6,908,497 B1 | 6/2005 | Sirwardane | |
| 6,969,418 B1 | 11/2005 | Hu | |
| 7,132,090 B2 | 11/2006 | Dziedzic et al. | |
| 7,541,011 B2 * | 6/2009 | Hu | 423/220 |
| 7,699,909 B2 * | 4/2010 | Lackner et al. | 95/236 |
| 7,708,814 B2 * | 5/2010 | Liu | 96/52 |
| 2006/0185985 A1 * | 8/2006 | Jones | 205/508 |

* cited by examiner

*Primary Examiner*—Frank M Lawrence
(74) *Attorney, Agent, or Firm*—James B. Potts; Mark P. Dvorscak

(57) ABSTRACT

Two methods are provide for the separation of carbon dioxide from the flue gases. The first method utilizes a phase-separating moiety dissolved in an aqueous solution of a basic moiety to capture carbon dioxide. The second method utilizes a phase-separating moiety as a suspended solid in an aqueous solution of a basic moiety to capture carbon dioxide. The first method takes advantage of the surface-independent nature of the $CO_2$ absorption reactions in a homogeneous aqueous system. The second method also provides permanent sequestration of the carbon dioxide. Both methods incorporate the kinetic rate enhancements of amine-based scrubbing while eliminating the need to heat the entire amine solution (80% water) in order to regenerate and release $CO_2$. Both methods also take advantage of the low-regeneration temperatures of $CO_2$-bearing mineral systems such as $Na_2CO_3/NaHCO_3$ and $K_2CO_3/KHCO_3$.

19 Claims, 4 Drawing Sheets

CO₂ SEPARATION FROM LOW-TEMPERATURE FLUE GASES

CONTRACTUAL ORIGIN OF THE INVENTION

The United States Government has rights in this invention pursuant to the employer-employee relationship of the Government to the inventors as U.S. Department of Energy employees at the National Energy Technology Laboratory.

BACKGROUND OF THE INVENTION

1. Field of the Invention

This invention relates to an improved method of separating carbon dioxide from fluids, and more specifically, this invention relates to an improved method of separating carbon dioxide from flue gases that utilizes amine-based scrubbing and low regeneration temperatures of $CO_2$ bearing mineral systems to permanently sequester carbon dioxide.

2. Background of the Invention

Increased global warming due to the presence and production of greenhouse gases such as carbon dioxide ($CO_2$), makes the capture and permanent sequestration of carbon dioxide by economical means imperative.

Carbon dioxide capture is the separation of $CO_2$ from emissions sources or from the atmosphere with the subsequent recovery of a concentrated stream of $CO_2$ that is amenable to sequestration or conversion.

Pulverized coal (PC) plants, which are 99 percent of all coal-fired power plants in the United States, burn coal in the presence of air to create steam. The steam, in turn, drives a turbine to generate electricity. Carbon dioxide is emitted as part of the coal combustion flue gas at atmospheric pressure and at a concentration of 10-15 volume percent of the flue gas.

Post-combustion capture of $CO_2$ poses a significant engineering challenge because (1) the low pressure and dilute concentration of the carbon dioxide dictate a high actual volume of gas to be treated; (2) trace impurities in the flue gas tend to reduce the effectiveness of $CO_2$ absorbing processes; and (3) compressing captured $CO_2$ from atmospheric pressure to pipeline pressure (1,200-2,000 pounds per square inch (psi)) represents a large parasitic energy load to the overall power generation process.

Analysis conducted at the National Energy Technology Laboratory (NETL) in Pittsburgh, Pa. and Morgantown, W. Va. shows that $CO_2$ capture and compression using amines raises the cost of electricity from a newly-built supercritical PC power plant by 84 percent, from 4.9 cents/kWh to 9.0 cents/kWh.

The goal for advanced $CO_2$ capture systems is that they increase the cost of electricity by no more than 20 percent compared to a no-capture case. Another goal is to have an absorbing moiety which does not undergo degradation as amines do in present capture systems.

U.S. Pat. No. 6,387,337 awarded to Pennline, et al. on May 14, 2002 discloses a carbon dioxide capture process using regenerable solid sorbents such as an alkali metal oxide or alkali metal carbonate. Potassium carbonate ($K_2CO_3$) or a similar moiety can be supported on a high surface area of activated alumina ($Al_2O_3$) (12 to 17 weight percent (wt. %) of potassium carbonate). These composite, solid sorbent materials are contacted directly with a CO2-bearing gas stream. The product formed from sorption of carbon dioxide is taken aside and heated to regenerate the sorbent. No significant chemical degradation is observed, but physical attrition can be significant. Physical attrition describes the separation of $K_2CO_3$ from the activated alumina support resulting from interparticle abrasion. Loss of $K_2CO_3$ from composite beads results in decreased $CO_2$ bearing capacity of the beads. $CO_2$ loading occurs between from about 60° C. to 100° C. according to the following reaction equations.

  (1)

  (2)

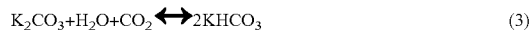  (3)

Subsequent thermal desorption of $CO_2$ from potassium hydrogen carbonate ($KHCO_3$)/alumina support takes place at temperatures around 145° C. to 150° C., according to the reverse of reaction 3, supra.

Aqueous scrubbing solutions containing monoethanolamine (2-aminoethanol) ($NH_2CH_2CH_2OH$) (MEA) are also utilized for $CO_2$ separation. The use of MEA solutions is energy-intensive, corrosive and follows the reaction equation infra

  (4)

The regeneration of MEA scrubber solution has an enthalpy value for 20 and 30 mass percent solutions of +5308 kilojoules (kJ) and +4503 kJ per kilogram (kg) of carbon dioxide released, respectively. These enthalpies include solvent heating, vaporization of water, vaporization of absorbent, and the reaction enthalpy of Reaction 4. The regeneration also causes some degradation of the amine.

Other work has been done in the area of carbonate sorbents. Nelson, T. O.; Green, D. A.; Raghubir, P. G.; Portzer, J. W.; Coker, D.; McMichael, W. J.; and Figueroa, J., "Dry Regenerable Carbonate Sorbents for Capture of Carbon Dioxide from Flue Gas," Fourth Annual Conference on Carbon Capture and Sequestration, Hilton Alexandria Mark center, Alexandra, Va., May 2-5, 2005. In this work, the investigators demonstrated the energy savings dry carbonate sorbents provide compared to conventional monoethanolamine (MEA) aqueous scrubbing solution systems.

In contrast to dry carbonate sorbents, the Benfield Process has found wide application for removal of acid gas components such as $CO_2$ from mixed gas streams. The process entails the use of activated $K_2CO_3$ solutions (about 30 weight percent aqueous) for the absorption of carbon dioxide and thermal regeneration of the $CO_2$ loaded solution by steam stripping. This process is designed for bulk $CO_2$ removal from high pressure streams having a feed $CO_2$ partial pressure of 6.8 atmospheres (atm) and, for $CO_2$ removal, is typically used in synthesis gas treating in ammonia ($NH_3$) plants and in direct iron ore reduction plants.

Enzymatic catalysis employing carbonic anhydrases, such as the biological catalysts (zinc metalloenzymes) responsible for interconversion of carbon dioxide and hydrogen carbonate (bicarbonate) ($HCO_3^-$) in living organisms, have been used to sequester carbon dioxide. For example, U.S. Pat. No. 7,132,090 awarded to Dziedzic, et al. on Nov. 7, 2006 discloses a method of converting carbon dioxide by placing the gas in a fluid medium, catalyzing conversion of the gas to carbonic acid with carbonic anhydrase, followed by reaction of the carbonic acid with a mineral cation such as calcium ion ($Ca^{2+}$) or magnesium ion ($Mg^{2+}$) to form a solid carbonate salt.

Studies have been made with regard to the removal of $CO_2$ by metal oxides and metal hydroxides, respectively. Stolaroff, J. K.; Lowry, G. V.; and Keith, D. W., "Using CaO and MgO-Rich Industrial Waste Streams For Carbon Sequestration," Energy Conversion and Management, 46, 687-699 (2005). In the first method, the industrial waste is mixed with water and reacted with $CO_2$. A limitation of this method is the relatively low rate of reaction resulting from the limited solubility of $CO_2$ in these mixtures.

The second method, described in: Stolaroff, J.; Keith, D., A Pilot-Scale Prototype Contactor for $CO_2$ Capture From Ambient Air: Cost And Energy Requirements, GHGT⁻8; 8$^{th}$ International Conference on Greenhouse Gas Control Technologies, 19-22 Jun. 2006, Trondheim, Norway) allows for thermal regeneration of calcium carbonate by heating to temperatures of approximately 900° C.

The Solvay process utilizes two alkalis (including ammonia) in sequential order to convert $CO_2$ to sodium hydrogen carbonate ($NaHCO_3$) for commercial use, according to Equation 5.

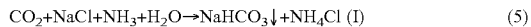

(5)

The Solvay process was not designed for $CO_2$ sequestration and is not practical for use in the sequestration of $CO_2$ from fossil fuel power plants. A study has been made where the Solvay process is modified to use an aqueous solution of a sterically hindered amine and a chloride to fabricate sodium hydrogen carbonate. Huang, H. P.; Shi, Y.; and Chang S. G., "Dual Alkali Approaches for the Capture and Separation of $CO_2$," Energy & Fuels, 15 (2), 263-268, 2001.

U.S. Pat. No. 6,969,418 awarded to Hu on Nov. 29, 2005 discloses a phase-enhanced gas-liquid absorption method wherein a binary organic-aqueous liquid system is used to capture $CO_2$ and other acid anhydrides. A less dense organic liquid phase rests upon an aqueous phase and the organic liquid phase absorbs acid anhydrides at a faster rate and transports the acid anhydrides into the aqueous phase for subsequent reaction and eventual separation of $CO_2$ in the form of reaction products.

U.S. Pat. No. 6,908,497 awarded to Sirawardane on Jun. 21, 2005 discloses a process for the manufacture of amine-containing solid sorbents whose absorption capabilities are independent of the sorbents' surface areas.

U.S. Pat. No. 6,547,854 awarded to Gray, et al. on Apr. 15, 2003 discloses a method for the manufacture of amine enriched solid sorbents for carbon dioxide capture.

None of the aforementioned patents or papers disclose a method to regenerate $CO_2$-loaded aqueous amine solutions (MEA or similar amines) through reaction with a phase-separating reagent such as dissolved alkali metal carbonates, alkaline earth metal oxides, or alkaline earth metal hydroxides.

Also, none of the aforementioned patents or papers disclose a method to capture carbon dioxide via phase separation of dissolved $CO_2$ as a crystalline solid precipitate. Furthermore, none of the aforementioned patents or papers disclose a method to accomplish rapid crystalline solid precipitate alkali metal bicarbonate formation through catalysis by MEA or similar amines. Also, none of the aforementioned patents or papers disclose a method to accomplish rapid alkaline earth metal oxide or alkaline earth metal hydroxide carbonation through catalysis by MEA or similar amines.

In addition, none of the aforementioned patents or papers disclose a method to use bases and base anhydrides present in industrial wastes as capture agents for $CO_2$ by suspending the wastes in aqueous solutions of MEA or similar inhibited amines.

A need exists in the art for a method to reduce the energy cost of carbon capture. A need also exists in the art for a method to reduce the energy and financial cost of carbon dioxide regeneration from capture agents. The method should readily separate carbon dioxide in solid form.

A need also exists in the art for a method to sequester carbon dioxide using bases and base anhydrides present in industrial wastes through suspending the solid wastes in aqueous solutions.

SUMMARY OF THE INVENTION

It is an object of the present invention to provide a method for the absorption and separation of carbon dioxide that overcomes many of the disadvantages of the prior art.

Another object of the present invention is to provide an improved method for extracting carbon dioxide from a fluid stream. A feature of the invention is using a scrubbing solution (i.e., phase-separating moiety) with a basic moiety, whereby the phase-separating moiety provides carbonate ion in the solution, and regenerates the basic moiety in situ. An advantage of these features is that overall carbon dioxide absorption capacity of the scrubbing solution is increased.

Yet another object of the present invention is to provide an improved method which uses a scrubbing solution with a basic moiety to absorb carbon dioxide via chemical reactions. A feature of the invention is that the phase-separating moiety provides carbonate ion ($CO_3^{2-}$) in the solution. Another feature is that the phase-separating moiety regenerates the basic moiety in situ via chemical reactions. An advantage of these features is that the overall carbon dioxide absorption capacity of the scrubbing solution is increased.

Still another object of the present invention is to provide a method to increase reaction rates of carbon dioxide with carbonates. A feature of this invention is that the rate of absorption of $CO_2$ and the rate of regeneration of reacting moieties are independent of contact surface area between reacting moieties. Another feature of this method of the invention is that the carbon dioxide reacts with dissolved carbonate moieties and basic moieties in aqueous solution. An advantage of these features is lower costs due to a much faster process.

Another object of the present invention is to provide a method which can more economically use calcium oxide/calcium hydroxide and magnesium oxide/magnesium hydroxide-rich industrial waste to sequester $CO_2$. A feature of the invention is that the waste is used as a finely ground solid suspended in an aqueous basic solution. An advantage of this feature is that it provides a substantially faster rate of reaction, as compared to reaction of the same finely ground solid suspended in water without the presence of dissolved moiety. Another advantage is lower costs due to the use of waste materials as reactants.

Yet another object of the present invention is to provide a $CO_2$ sequestration method which provides a more facile mode for separation of the carbonate formed by the method. A feature of this invention is that metal hydrogen carbonates (bicarbonates) are formed by the reaction of absorbed carbon dioxide with dissolved metal carbonates, such that the hydrogen carbonate's solubility limit in the amine-bearing solution is exceeded to the point where metal bicarbonates precipitate out of the solution. An advantage of this feature is that lower costs are incurred due to the establishment of this two-phase reaction stream. As such, easier modes of separation and isolation of the solid-phase hydrogen carbonate products are utilized, thereby lowering costs of reclamation.

Still another object of the present invention is to provide an alkaline-based $CO_2$ sequestration method which allows for a more facile regeneration of the basic moiety. A feature of this invention is that the basic moiety is regenerated by chemical means. An advantage of this feature is that the degradation of the basic moiety is minimized. Another advantage of this feature is a considerable savings in energy costs and basic moiety replacement costs.

Yet another object of the present invention is to provide a method which provides a phase-separating moiety with a lower regeneration heat requirement. A feature of this invention is that the regeneration heat requirements of alkali metal hydrogen carbonates (bicarbonates) are lower than that of commonly used aqueous solutions of MEA. An advantage of this feature is lower energy requirements to release $CO_2$ gas.

Briefly, the invention provides a method for the separation of carbon dioxide from fluid flows, the method comprising contacting a phase-separating moiety dissolved within an aqueous solution of a basic moiety with the carbon dioxide-containing fluid.

The invention also provides a method for the separation of carbon dioxide from fluid flows, the method comprising contacting the $CO_2$-containing fluid with a solution which comprises a phase-separating moiety suspended as a solid within an aqueous solution of a basic moiety.

BRIEF DESCRIPTION OF THE DRAWING

The invention together with the above and other objects and advantages will be best understood from the following detailed description of the preferred embodiment of the invention shown in the accompanying drawings and photos, wherein.

DETAILED DESCRIPTION OF INVENTION

Figure 1:
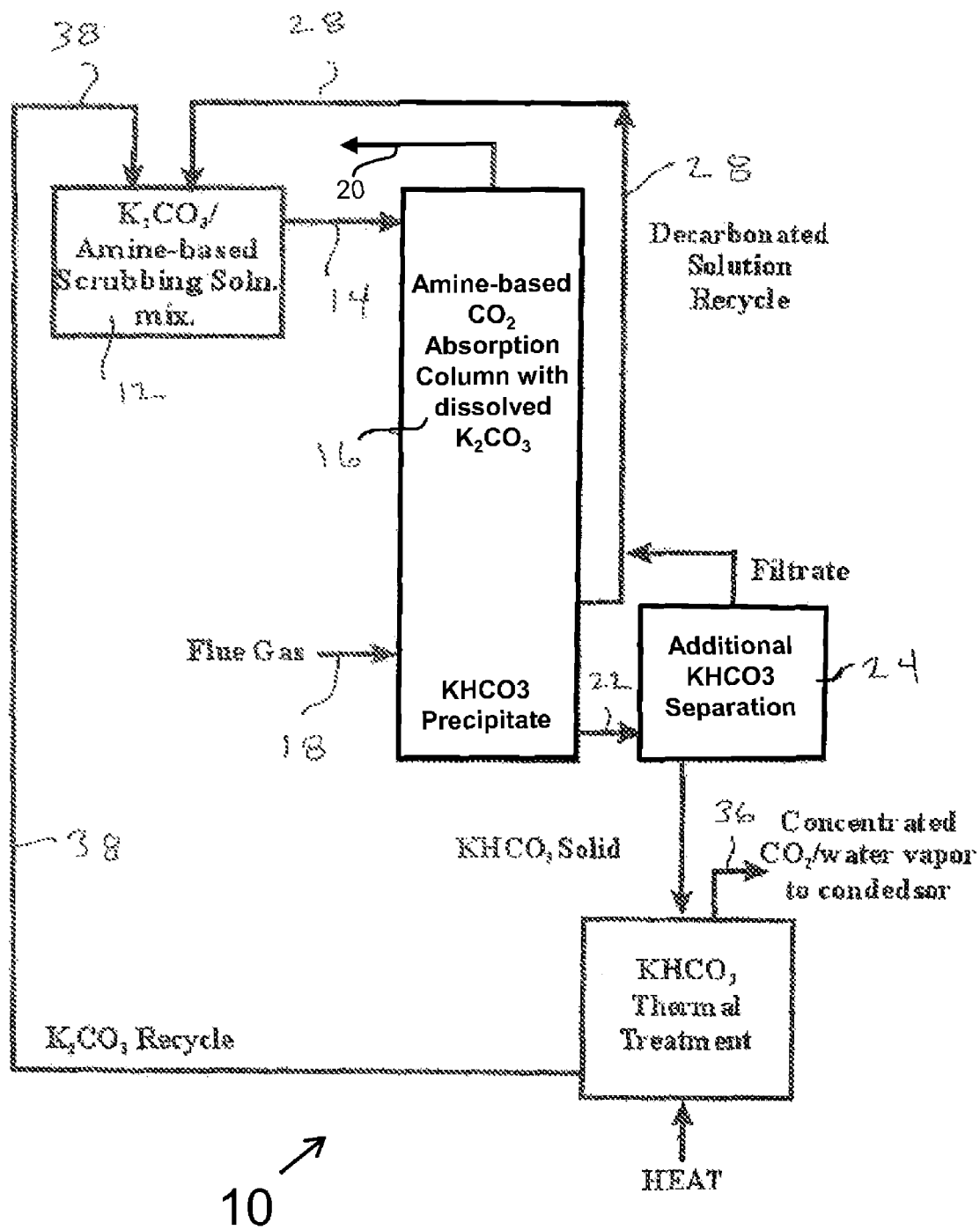
FIG. 1 is a schematic diagram of a closed loop method for CO capture and sequestration or regeneration of the $CO_2$, if wanted, using water-soluble $M_2CO_3/MHCO_3$ where M is an alkali metal cation, in accordance with features of the present invention.

The inventors have devised methods by which carbon dioxide can be captured and permanently sequestered as metal hydrogen carbonates. The invention extracts carbon dioxide from a myriad of fluids, including, but not limited to, flue gas, air, Fischer-Tropsch synthesis gas, automobile exhaust, industrial process exhaust, and combinations thereof.

Features of the invention including using a phase-separating moiety within a solution of a basic moiety, all of which is contacted with a carbon dioxide-containing fluid such as flue gas. This feature enables the ready capture and separation of carbon dioxide as a solid-phase metal hydrogen carbonate. This allows for reduction of the storage space needed for the carbon dioxide. This is feasible, in part, because metal hydrogen carbonates such as those containing potassium, sodium, and calcium have relatively low water solubilities.

A salient feature of the invention is the use of chemical regeneration to conserve a basic scrubbing moiety. This feature allows the absorption of $CO_2$ for the instant invention to have a greater reaction rate than with conventional basic scrubbing solutions, e.g., amines as solutes.

Another salient feature of the invention is the use of a regenerable phase-separating moiety in an aqueous solution which contains a basic scrubbing moiety. The phase-separating moiety regenerates, by chemical reactions the basic moiety which initially absorbs the $CO_2$.

In one embodiment of the invented method, the phase-separating moiety is an alkali metal carbonate present in a dissolved form in aqueous solution. In a second embodiment, the phase-separating moiety is an insoluble solid suspended in aqueous solution. One suitable moiety is an alkaline earth metal carbonate.

Basic Moiety Detail

The basic moiety for both methods is an amine, ammonia, ionic base, or combinations thereof. In the event of the basic moiety being an amine, the amine solution can have a chemical inhibitor to prevent or retard amine solvent oxidation degradation.

The use of an amine moiety in the two methods described herein catalyzes the hydration of $CO_2$. The hydration itself is the rate-limiting step in this invention. The use of an amine such as MEA and the $K_2CO_3/KHCO_3$ system as described infra comprise the preferred embodiment of the first method of this invention, but is not limited to that amine and that metal carbonate/metal hydrogen carbonate system.

The basic moiety is chemically regenerated whereas the metal carbonate is thermally regenerated. The phase-separating moiety has a lower regeneration temperature than does monoethanolamine (MEA), an amine used herein as an example of the basic moiety.

In the reactions shown infra, MEA is used as an example and is not intended to limit the amines and other basic moieties which can be used in this invention. Other amines and hindered amines with relatively low volatility will function in a manner similar to that illustrated. Suitable amines include, but are not limited to Diethanolamine (DEA), hexaethyleneheptamine, monoethanolamine (MEA), triethylamine, (TEA), tetraethylenepentamine, pentaethylenehexamine, 2-amino-2-methyl-1-propanol (AMP), methyldiethanoamine (MDEA), piperidine, piperazine, pyridine, morpholine, and combinations thereof.

Phase-Separating Moiety Detail

The use of a phase-separating moiety enables the reduction of energy use for regeneration of active agents used in the capture and sequestration process. For both methods disclosed herein, the phase-separating moiety regenerates by chemical reactions the basic moiety which initially absorbs the $CO_2$. For one method the phase-separating moiety is present in a dissolved form in the aqueous solution; for the other method, the phase-separating moiety is present as an insoluble solid suspended in the aqueous solution. All embodiments of the invented method require three reactive components:

Water

MEA, or compounds having similar functionalities.

Material that reacts with $CO_2$ (i.e., potassium carbonate) to yield sparingly soluble or insoluble product material A salient feature of the invention is that all three components preferably are utilized together, and simultaneously. In embodiments of the invented process, all three features must be present.

Which of the two methods is employed depends upon the water solubility of the phase-separating moiety.

An internal screw conveyor can be utilized to move $MHCO_3/M_2CO_3$ while low grade steam from the power plant is passed by the outside of the screw conveyor. Heat from the steam transfers to the screw conveyor wall and subsequently to the solids, converting $MHCO_3$ to $M_2CO_3$ and releasing $CO_2$. The solid $M_2CO_3$ can be cooled before reintroduction into the scrubbing phase as is done with recycled $M_2CO_3$ in FIG. 1 as described infra.

For both methods, the prepared mixture/solution is contacted with a $CO_2$-bearing stream, such as flue gas from pulverized coal combustion, in a base-promoted absorption step. Subsequent to loading of $CO_2$ to the mixture/solution, $CO_2$ associated with the amine and $CO_2$ dissolved in the aqueous phase (initial pH=approx. 10 to 12) as carbonate ion ($CO_3^{2-}$) reacts with the phase-separating reagent.

$CO_2$ Separation Method Detail $CO_2$ separation is achieved by reacting $CO_2$ from flue gas with an aqueous solution of MEA and sodium carbonate or potassium carbonate (alkali metal carbonates). MEA catalyzes the reaction between dissolved $CO_2$ (as a carbamate), water, and the alkali metal carbonate (one mole) to form alkali metal bicarbonate (2 moles). As the alkali metal bicarbonate forms, its solubility limit is exceeded and it precipitates out from solution in crystalline form (crystalline alkali metal bicarbonate is formed because the MEA allows the solution to be effectively supersaturated with $CO_2$). Alkali metal bicarbonate is further dewatered by filtration. Dewatered alkali metal bicarbonate is heated to release $CO_2$ and water and convert alkali metal bicarbonate back to alkali metal carbonate. Alkali metal carbonate is re-dissolved in the $CO_2$-lean scrubbing solution; the reformed aqueous solution of MEA/alkali metal carbonate can be exposed again to flue gas.

Figure 2:
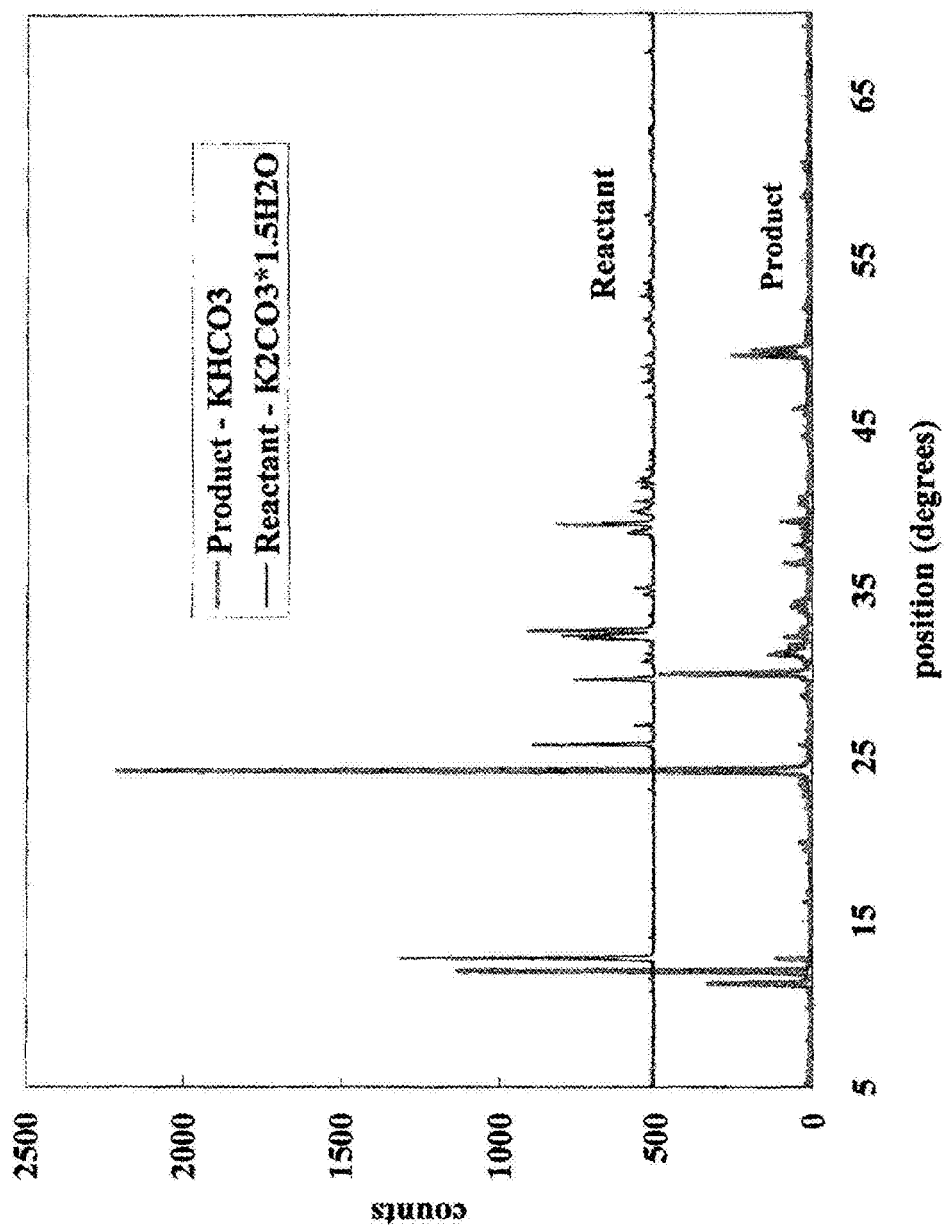
FIG. 2 is a plot of the results of X-ray diffraction (XRD) analysis (counts versus position in degrees) of carbonation reactant and product where the reactant is $K_2CO_3 \cdot 1.5H_2O$ before being dissolved in water. The product is $KHCO_3$ precipitated as a result of the carbonation of a MEA scrubbing solution which contains the reactant, in accordance with features of the present invention.

This first embodiment is a closed-loop $CO_2$ separation where carbonated product forms in solution. Upon reaching its own solubility limit, the carbonated product begins to precipitate as a solid hydrogen carbonate (bicarbonate). For $K_2CO_3$ and $KHCO_3$, the solubilities at approximately 20° C. are 111 grams (g) per 100 milliliters (mL) of $H_2O$ and 33.7 g/100 mL of $H_2O$, respectively. Similarly, for sodium carbonate ($Na_2CO_3$) and sodium hydrogen carbonate ($NaHCO_3$), the solubilities at approximately 0° C. are 7.1 g/100 mL of $H_2O$ and 6.9 g/100 mL of $H_2O$, respectively. Analysis via XRD is used to determine the degree of success of conversion from carbonate to hydrogen carbonate (bicarbonate) as shown in FIG. 2.

In the closed loop method, $CO_2$ bearing gas is contacted with the scrubber solution in a gas/liquid stage such as a countercurrent spray tower. The resultant contact allows $CO_2$ to dissolve into the solution, convert to carbonic acid ($H_2CO_3$), dissociate to carbonate ($CO_3^{2-}$)/hydrogen carbonate ($HCO_3^-$) and $H^+$, or form carbamate (—NH(CO)O—) with amine moieties. Equations 6 through 17 infra show the reactions for both $K_2CO_3/KHCO_3$ and $Na_2CO_3/NaHCO_3$ systems.

FIG. 1 is a schematic diagram of the "closed loop separation" method and is described infra. Example 1 illustrates this first method. In summary, the salient steps and features of the separation method include the following:

1. $CO_2$ dissolves into water.
2. Dissolved $CO_2$ (carbonic acid and products of its deprotonation) reacts with other dissolved species. For example, dissolved $CO_2$ reacts with dissolved MEA quickly to form carbamate. To a lesser extent, dissolved $CO_2$ reacts with dissolved alkali metal carbonate to form alkali metal bicarbonate. (To a lesser extent because $CO_2$ reacts more slowly with alkali metal carbonate than with MEA.)
3. Carbamate ion reacts with alkali metal carbonate.
4. MEA acts as a catalyst to increase the overall rate of bicarbonate formation. Carbamate reacts quickly with dissolved alkali metal carbonate to form alkali metal bicarbonate at a significantly faster rate than would be observed if reaction was between alkali metal carbonate and standard dissolved carbonate species (carbonate, bicarbonate, carbonic acid). MEA also vastly increases the amount of $CO_2$ that can be dissolved into the solution because it acts as a basic buffer for the dissolving acid gas $CO_2$.

The presence of MEA or similar amine/inhibited amine to the solution allows significant increases in the overall solubility of $CO_2$. For example, the solubility of total $CO_2$ species in pure water at 25° C. increases from 0.033 gram-moles per liter to 1.44 gram-mole per liter when the $CO_2$ is dissolved into a 2.0 gram-mole per liter MEA aqueous solution.
5. As a catalyst, MEA is not consumed in this reaction, but is chemically regenerated to its original form. The reaction of carbamate with alkali metal carbonate to produce alkali metal bicarbonate strips the MEA of the carbamate and regenerates its basic moiety—thereby freeing it up to react with more $CO_2$.

The inventors found that MEA regeneration is accomplished through chemical regeneration as compared to heating (thermal regeneration) of MEA to release $CO_2$ as is commonly done in standard MEA scrubbing.
6. The alkali metal bicarbonate precipitates as a crystalline solid. Surprisingly and unexpectedly, it was found was that the precipitates (of for example KHCO3) were very crystalline in nature. Crystallization occurs once saturation or over-saturation conditions are established. The shift from alkali metal carbonate to alkali metal bicarbonate with reaction between the alkali metal carbonate and carbamate is driven by the high dissolved concentration of alkali metal carbonate and by the high total dissolved $CO_2$ concentration (carbonate+bicarbonate+carbonic acid+carbamate).

Formation of two moles of alkali metal bicarbonate for every mole of alkali metal carbonate, catalysis of reaction by MEA, and the lower solubility of sodium and potassium bicarbonate, as compared to sodium and potassium carbonate, all contribute to the formation of crystalline alkali metal bicarbonate.
7. Precipitated alkali metal bicarbonate is separated from the reactive MEA/water/alkali metal carbonate solution. The alkali metal bicarbonate contains $CO_2$ that was absorbed into the solution. When it is physically removed from the mixture, $CO_2$ is removed from the solution.
8. Separated alkali metal bicarbonate is heated to release $CO_2$ and convert solid back to alkali metal carbonate. The resulting concentrated $CO_2$ stream is the separated $CO_2$.
9. Following regeneration of alkali metal carbonate, it is returned to the MEA/water/alkali metal carbonate solution and redissolved, thereby recreating the original scrubbing solution. This step to the process closes the chemical loop to complete this regenerable process.

$CO_2$ Sequestration

Method Detail

Figure 3:
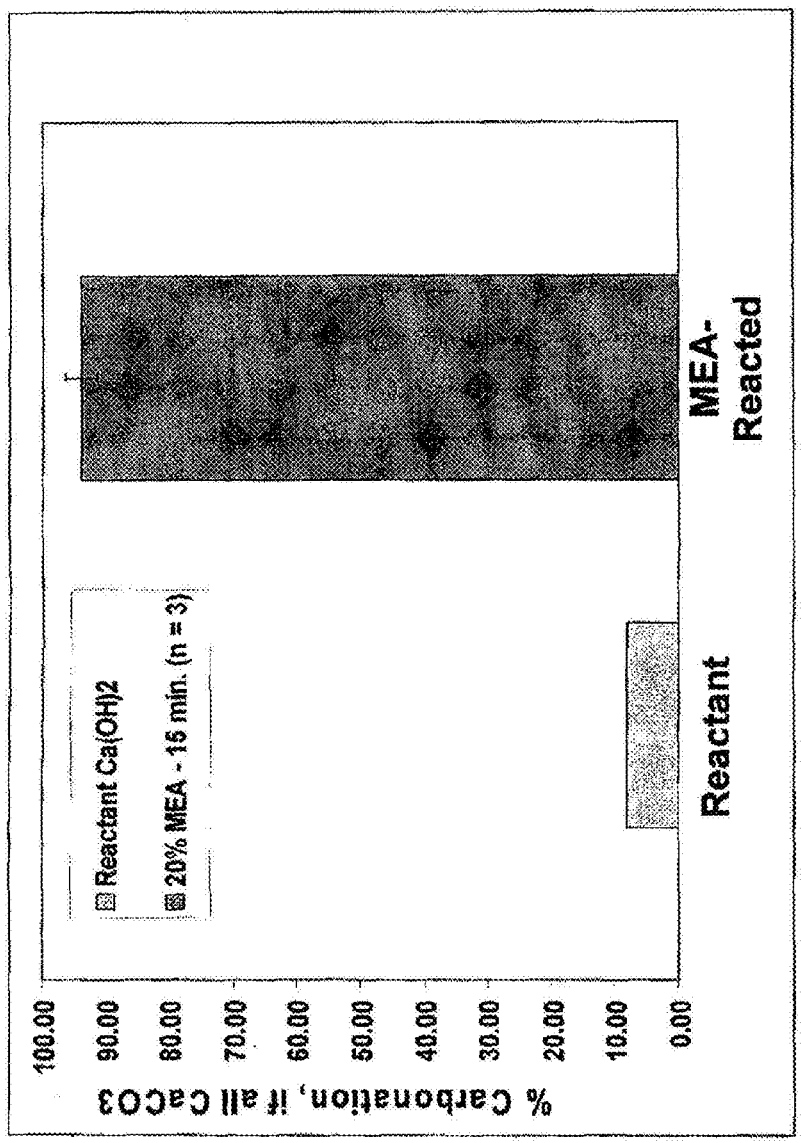
FIG. 3 is a bar graph of percent carbonation comparing using only a reactant calcium hydroxide (hydrated lime, $Ca(OH)_2$) in aqueous solution against using calcium hydroxide in a 20 percent volume/volume (mass percent) aqueous MEA solution when both solutions were sparged with carbon dioxide, in accordance with features of the present invention.

This second method is termed a "once-through" carbonation of $CaO/Ca(OH)_2$-bearing waste materials. This second method is similar to the first method described supra except that instead of an alkali metal (Group I) carbonate, a significantly less water soluble alkaline earth metal hydroxide such as $Ca(OH)_2$ or $Mg(OH)_2$ or alkaline earth metal hydroxide-bearing waste material such as waste cement or certain types of fly ash (such as Class C ASTM C618 flyash) are employed as phase-separating moieties. Using those materials, the phase-separating moiety is a suspended solid and the moiety converts to a carbonated solid form via liquid-solid contact with the dissolved $CO_2$ and subsequent reaction. In an embodiment of the invention, the solids are homogeneously mixed throughout the basic solution. In one embodiment of this method, carbon dioxide reacts with solid particles of phase-separating reagent having a size of between 1 micron and 2000 microns to form an insoluble carbonate-containing solid Equations 18 through 21 infra show the reactions for this second method. Use of a basic moiety such as MEA greatly aids in the reaction of relatively insoluble metal carbonates in this invention as shown in FIG. 3.

Use of an amine as the basic moiety in the "once-through carbonation" method is a preferred embodiment for this method of the invention.

Preferably, the waste material is finely divided, using mechanical grinding if needed, to ensure high surface area for the solid phase-separating moiety and to allow sufficient contact between the three phases present therein, gas, liquid, and solid. Fly ash surface area is typically sufficient to achieve a high degree of conversion of the fly ash to a carbonated solid form. The waste concrete can have a particle size which can range from about 50 microns ($\mu$m) to about 2000 $\mu$m in diameter.

To summarize, the features of the second embodiment include the following:
1. The phase separating reagent, i.e., the chemical reagent that effectively strips $CO_2$ from solution (dissolved initially as carbonate ion or carbamate) is not an alkali metal carbonate, but an alkaline earth metal hydroxide or oxide. This is a simpler reaction than that featured in the separation method detailed supra. However, this reaction is also catalyzed by MEA. In the presence of MEA, $CO_2$ dissolves rapidly and in relatively large quantities. As noted supra, all three reactants (water, MEA, and moieties reactive to carbon dioxide) are required. Otherwise, the solubility of $CO_2$ would be significantly lower if calcium hydroxide were in contact with water without MEA present.
2. The reaction between carbamate and earth metal hydroxide or oxide is very fast. The inventors believe that this increase in reaction of carbamate with earth metal hydroxide/oxide (in contrast to reaction of the same species with dissolved carbon dioxide in water only) is a result of both the large concentration of total dissolved carbon dioxide achievable in MEA-containing solutions, and an indirectly observed catalytic functionality of the MEA-carbamate complex in decreasing the overall activation energy of reactions under consideration.
3. The product of carbamate and alkaline metal oxide or alkaline metal hydroxide reaction is the carbonate and or bicarbonate of the alkaline earth metal. In contrast to the separation method described supra, there is no attempt to regenerate these alkaline earth metals once they react with dissolved $CO_2$ species. Rather, these stable products are landfilled or otherwise sequestered. Specifically, product alkaline earth metal carbonates are separated, along with spent reactant solids, and disposed of.
4. The reaction between carbamate and alkaline metal hydroxide or alkaline metal oxide serves to chemically regenerate the MEA in aqueous solution, as opposed to standard thermal regeneration. Regenerated MEA/water/can be reloaded with alkaline earth metal oxide/hydroxide bearing material and used to absorb and sequester $CO_2$.

For both methods, the carbonated solid (hydrogen carbonate/bicarbonate) is removed from the bulk scrubber solution and processed. The separation method employed includes, but is not limited to, gravity filtration of precipitated/crystallized $MHCO_3$, vacuum filtration, membrane filtration, belt filter press, centrifugation, and liquid evaporation. The partially dried solid is transported to the separation apparatus for solid/liquid separation by a screw feed, conveyor or other transport means.

Reaction-produced $KHCO_3$ is readily and easily dewatered due to the formation of very crystalline $KHCO_3$. This degree of crystallinity results from the supersaturation of MEA-associated $CO_2$ and high concentrations of dissolved $K_2CO_3$ in the reaction mixture. This crystalline precipitate has superior separation properties compared to those of non-crystalline precipitates. In contrast to non-crystalline (i.e. amorphous precipitates), very crystalline precipitate generated in the current invention comprises particles each having relatively large three dimensional crystalline lattice that has spread, to some degree, from a nucleating site. The very crystalline particle grows rapidly, as compared to the fine particulate precipitate which is produced by state of the art processes, and is of great enough size to precipitate spontaneously and unaided from the reactive solution. This improves the filterability of the resulting product inasmuch as filters are not clogged as easily as they are with amorphous product. Less energy is therefor required during filter operations.

A critical factor in the capture of $CO_2$ is the energy cost as emphasized supra. Regeneration enthalpies for 20 percent and 30 percent mass fraction aqueous MEA solutions are given supra. Regeneration enthalpies for hydrogen carbonate (bicarbonate) precipitates can be determined by adding the particular reaction enthalpy and water vaporization enthalpy. The reaction enthalpies are +2918 kilojoules per kilogram (kJ/kg) of $CO_2$ for conversion of $NaHCO_3$ to $Na_2CO_3$ and +3082 kJ/kg of $CO_2$ for conversion of $KHCO_3$ to $K_2CO_3$. The water vaporization enthalpy for heating from water at 92.2° C. to steam at 100° C. is +2292.6 kJ per kg of $H_2O$.

The overall regeneration enthalpy of both methods can then be estimated as the heat energy required for the mass of hydrogen carbonate (bicarbonate) product sufficient to produce or regenerate 1 kg of $CO_2$ plus the liberation of the water present in the interstices of the precipitate following liquid/solid separation. Due to the presence of the water, this overall regeneration enthalpy will increase significantly with decreasing mass percent solids (increasing water mass fraction percent) content for the initial metal carbonate precipitate as displayed in FIG. 4.

As described In Example 1 infra and done for more than one experimental run, 30 seconds (1 min in Example 2 infra) of filtration with a low-vacuum (pressure of approximately 635 mm Hg) and a 0.45 micron ($\mu$m) glass fiber disk achieved a 90 mass percent solid metal hydrogen carbonate content in duplicate samples of metal hydrogen carbonate precipitate. At the aforementioned degree of solids' dewatering, FIG. 4 demonstrates that $CO_2$ release/regeneration can be achieved with only 79 percent of the enthalpy required for the regeneration of a 30 percent mass percent aqueous MEA scrubbing solution, and only 69 percent of the enthalpy required for the regeneration of a 20 percent mass percent aqueous MEA scrubbing solution. The energy savings incurred by the instant invention are aided by the separation of the hydrogen carbonate product through precipitation after reaction.

The partial pressure of the moiety to be separated from the fluid should be below the supercritical pressure of the moiety. In the case of $CO_2$, that pressure is 72.8 atmospheres (atm). Preferable partial pressures range from greater than 0.5 atm to less than 7 atm. The total operation pressure of the system must remain below the supercritical pressure of the moiety to be separated.

Increasing the $CO_2$ partial pressure can increase the solubility of the carbon dioxide in the scrubbing solution according to Henry's Law where $S=kP_{CO2}$ with S being concentration such as molarity (M) in moles per Liter, k being the Henry's Law constant for carbon dioxide, and $P_{CO2}$ is the partial pressure of carbon dioxide in the fluid such as the product gas from the combustion of pulverized coal. Increasing the solubility of $CO_2$ in the scrubbing solution can give a much greater rate of conversion of $CO_2$ to metal hydrogen carbonate.

The temperature range for operation is from about 32° C. to about 100° C.

After flue gas has gone through flue gas desulfurization (FGD), the flue gas's pressure is typically slightly above ambient pressure and the temperature around 60° C. to 70° C.

The operational pH if the invented process is from about 7 to 12. For both methods of this invention, the loading of the carbonate-containing scrubbing with $CO_2$ eventually exceeds the buffering capability of the solution and the pH decreases or moves in an acidic direction.

The invention is applicable in pulverized coal combustion flue gas cleanup, particularly after any sulfur oxide ($SO_x$), nitrogen oxide ($NO_x$), mercury (Hg), arsenic (As), selenium (Se), and particulate removal.

MEA Scrubbing of $CO_2$ $$H_2O + CO_2 \leftrightarrow H_2CO_3 \quad (6)$$

$$H_2CO_3 \leftrightarrow H^+ + HCO_3^- \quad (7)$$

$$2\,MEA + H^+ + HCO_3^- \leftrightarrow MEA.H^+ + MEA.HCO_3^- \quad (8)$$

MEA Chemical Regeneration and the Precipitation of Crystalline $KHCO_3$:

$$K_2CO_3 + MEA.H^+ + MEA.HCO_3^- \leftrightarrow 2KHCO_3 + 2\,MEA \quad (9)$$

Secondary reactions are:

$$K_2CO_3 + H_2O + CO_2 \leftrightarrow 2\,KHCO_3 \quad (10)$$

Release of $CO_2$ and Regeneration of $K_2CO_3$ $$2\,KHCO_3 + Heat \leftrightarrow H_2O + K_2CO_3 + CO_2 \quad (11)$$

Similar reactions occur for a sodium carbonate ($Na_2CO_3$)/sodium hydrogen carbonate ($NaHCO_3$) system:

$$H_2O + CO_2 \leftrightarrow H_2CO_3 \quad (12)$$

$$H_2CO_3 \leftrightarrow H^+ + HCO_3^- \quad (13)$$

$$2\,MEA + H^+ + HCO_3^- \leftrightarrow MEA.H^+ + MEA.HCO_3^- \quad (14)$$

$$Na_2CO_3 + MEA.H^+ + MEA.HCO_3^- \leftrightarrow 2NaHCO_3 + 2\,MEA \quad (15)$$

As before, secondary reactions are:

$$Na_2CO_3 + H_2O + CO_2 \leftrightarrow 2NaHCO_3 \quad (16)$$

$$2NaHCO_3 + Heat \leftrightarrow H_2O + Na_2CO_3 + CO_2 \quad (17)$$

Similarly for $Ca(OH)_2$ and $CaO/Ca(OH)_2$, and other alkaline earth metals:

$$H_2O + CO_2 \leftrightarrow H_2CO_3 + H_2O \quad (18)$$

$CO_2$/MEA reaction (simplified):

$$2MEA + H_2O + CO_2 \leftrightarrow 2MEA.H^+ + MEA.HCO_3^- \quad (19)$$

Reaction of alkali metal hydroxides with $CO_2$-loaded MEA:

$$Ca(OH)_2 + MEA.H^+ + MEA.HCO_3^- \leftrightarrow 2\,MEA + CaCO_3 + H_2O \quad (20)$$

$$Mg(OH)_2 + MEA.H^+ + MEA.HCO_3^- \leftrightarrow 2MEA + MgCO_3 + H_2O \quad (21)$$

TABLE 1

Temperature Ranges of Reactions for Absorption and Regeneration of Phase-Separating Moiety.

| Reaction | Metal (X) | Absorption Temp (° C.) | Regeneration Temp (° C.) |
|---|---|---|---|
| $X_2CO_3 + CO_2 + H_2O \to 2XHCO_3$ | Na | <111 | 111-270 |
| $X_2CO_3 + CO_2 + H_2O \to 2XHCO_3$ | K | <145 | 145-200 |

Suitable regeneration temperatures for an aqueous MEA scrubbing solution are anything below the MEA degradation temperature, which can occur at a temperature of approximately 205° C. In contrast, MEA solution regeneration typically takes place between temperatures of about 110° C. and 120° C.

As can be seen in Table 1, the regeneration temperatures for the sodium and potassium carbonates and bicarbonates are higher than that of MEA; but the heat regeneration is not when they are separated from the bulk of the water in which they (and the MEA) reside. The inventors found that the overall heat required to regenerate these solids and release the carbon dioxide therefrom is considerably less than the heat required to regenerate or otherwise reclaim the MEA from a 20% MEA/80% water solution, or even a 30% MEA/70% water solution. This results in easier regeneration and lower energy costs.

For thermal regeneration, heat is passed through a conductive medium, e.g. steel, from a heat source and delivered to the solid $MHCO_3/M_2CO_3$ stream, although heat can be applied directly using a heated $CO_2$ gas stream. Indirect application of low grade steam from other areas of the overall process can be very economical.

Alternatively, heat can be applied directly to the stream using a heated carbon dioxide-containing fluid stream.

FIG. 1 is a schematic diagram 10 which depicts the closed loop embodiment of the instant invention.

A phase-separating moiety is homogeneously mixed with a basic moiety to produce a scrubbing mixture or solution 12. The solution contacts an absorption column 16 (Amine based $CO_2$ absorption column with dissolved $K_2CO_3$) via a conduit 14 or other means of ingress.

Flue gas 18 then contacts the column and reaction occurs after which carbon dioxide-scrubbed flue gas is evacuated 20.

Chemical regeneration of the basic moiety occurs in the absorption column 16. The product mixture 22 contacts a separation apparatus 24 such as a filtration device or a centrifuge in which dewatering as described supra occurs. The resulting filtrate from the separation apparatus 24 enters a decarbonated solution recycling system 28 which directs the filtrate back into the scrubbing solution 12.

The solid product from the separation step is thermally heated for a time sufficient to regenerate the phase-separating moiety. Carbon dioxide and water vapor have egress 36 to a condenser. The regenerated phase-separating moiety is recycled 38 back into the scrubbing solution 12.

FIG. 2 is a plot of the results of XRD analysis of carbonation reactant and product where the reactant is $K_2CO_3 \cdot 1.5H_2O$ before being dissolved in water. The product is $KHCO_3$ which is precipitated as a result of the carbonation of a MEA scrubbing solution which contains the reactant. The product has two distinctly different peaks at approximately 24 and 49 degrees with the 24 degree peak being very intense; whereas the reactant has a distinctly different set of peaks clustered around approximately 33 degrees. This change in XRD peak location between reactant and product indicates that the reactant carbonate is converted completely to bicarbonate product.

FIG. 3 is a bar graph which displays the positive effects of using MEA to assist carbonation of aqueous solution of alkaline earth metal carbonates as described earlier in the "once-through carbonation" method of the invention. The data displayed demonstrates nearly complete carbonation of calcium hydroxide (quick lime) after only 15 min of reaction with $CO_2$ sparged 20 percent (mass percent) aqueous MEA (right-hand bar); whereas the reaction of calcium hydroxide in $CO_2$ sparged water for the same period of time resulted in less than 10 percent conversion of the calcium hydroxide to calcium carbonate (left hand bar). The reaction evidenced by the right-hand bar was very aggressive and most likely could have neared completion in a matter of seconds.

The use of MEA as an aide greatly increases the efficacy of the instant invention. The "n=3" in the upper left-hand corner of the figure refers to the fact that the right-hand bar represents the mean $CaCO_3$ composition of product from triplicate experiments as determined by XRD. The small bracket spanning above and below the top of the bar represent one standard deviation above and below that mean.

Figure 4:
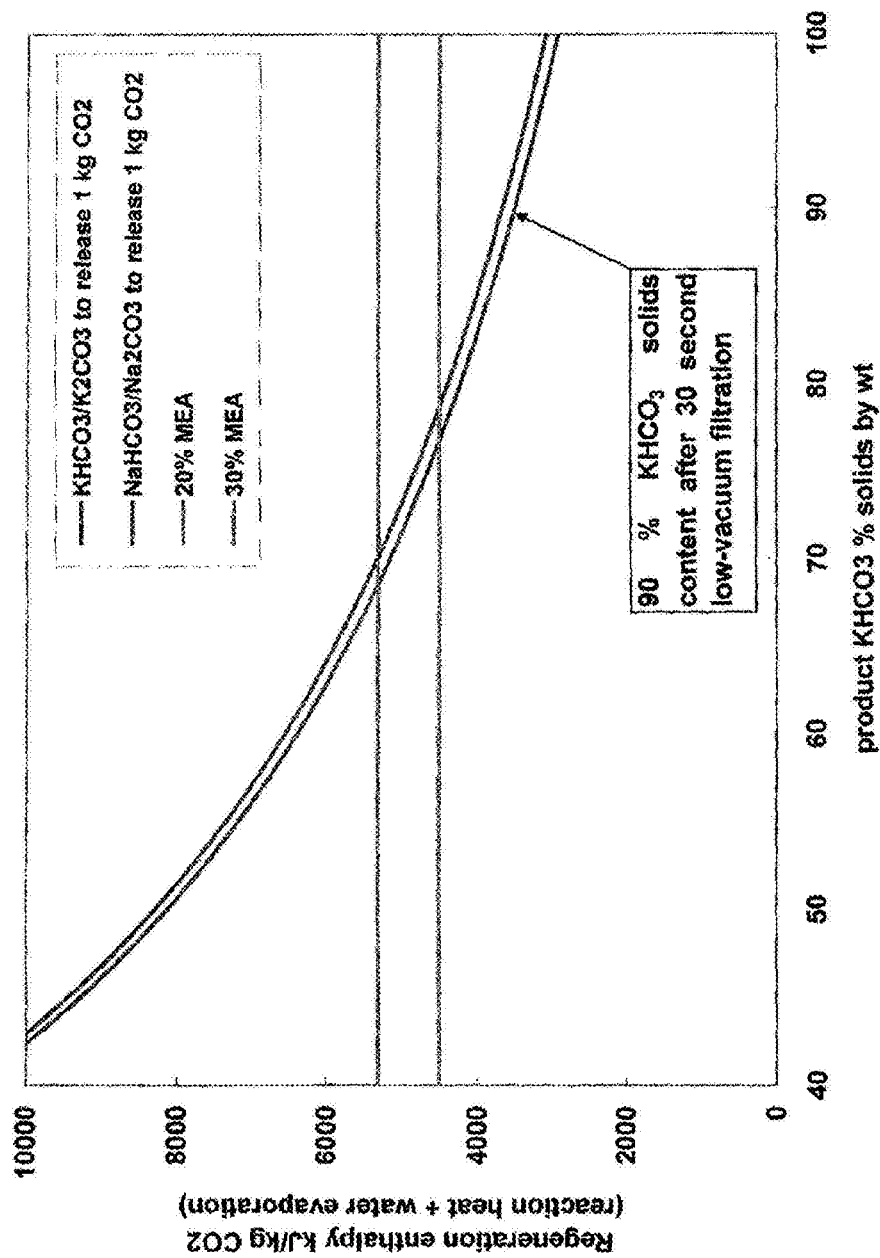
FIG. 4 is a plot of the regeneration enthalpy in kilojoules (kJ) per kilogram (Kg) of $CO_2$ versus the weight percent of potassium hydrogen carbonate in the product solid after the feeding of $CO_2$ into a potassium carbonate-monoethanolamine aqueous solution, in accordance with features of the present invention.

FIG. 4 is a plot of the regeneration enthalpy in kilojoules (kJ) per kilogram (Kg) of $CO_2$ versus the weight percent (wt. %) of potassium hydrogen carbonate ($KHCO_3$) in the product solid after the feeding of $CO_2$ into a potassium carbonate ($K_2CO_3$)-monoethanolamine (MEA) aqueous solution. The upper curve is the $KHCO_3/K_2CO_3$ curve for the regeneration enthalpy to release one kg of $CO_2$ and the lower curve similarly for $NaHCO_3/Na_2CO_3$. The upper horizontal line is the regeneration enthalpy for a 20 percent (mass percent) MEA aqueous solution and the lower horizontal line similarly for a 30 percent (mass percent) MEA aqueous solution. The enthalpy required to regenerate precipitated and partially dewatered metal hydrogen carbonates is plotted in FIG. 4 for comparison with regeneration enthalpy requirements of 20 and 30 weight percent MEA solutions. From this plot, it can be seen that, for solid content greater than approximately 80 percent, the metal hydrogen carbonate regeneration enthalpies are less than MEA aqueous solution regeneration enthalpies, with the distance between the lines representing the difference in regeneration enthalpy requirement.

This plot demonstrates that newly formed precipitates are preferably dewatered to the extent that they are from 75 to 80 percent solid by mass for the invented method to be energy cost-effective and have an advantage over MEA-only scrubbing solutions. At the graphical point of 90 percent solid metal hydrogen carbonate by mass, the metal hydrogen carbonate's regeneration enthalpy is 21 percent less than the regeneration enthalpy of 30 percent aqueous MEA, and similarly 31 percent than that of 20 percent aqueous MEA.

$KHCO_3$ product, after its separation from solution, undergoes low vacuum filtration of about 635 mm Hg, as described in Example 1 infra.

For both examples infra, starting temperatures just before the onset of $CO_2$ loading ranged from about 17° C. to about 20° C. Temperatures at the end of the reactions and before any cooling had begun ranged from about 35° C. to about 50° C.

Example 1

Closed Loop $CO_2$ Separation Via Phase-Separation Reagent with Thermal Regeneration and Amine Absorption Reagent with Chemical Regeneration The inventors have found the dissolution of the phase-separating moiety in the first method to enable the ready mixing of carbon dioxide and the phase-separating moiety in a way that is independent of the surface area of the carbon dioxide-capturing moiety. This greatly increases the efficacy of the invention. In the first method, the phase-separating moiety is dissolved in water to which a basic scrubbing moiety is also added. The basic scrubbing moiety is conserved throughout the process of absorption and chemical regeneration.

Absorption and regeneration temperatures are given in Table 1 supra for compounds of potassium and sodium.

Heat energy for the regeneration of the phase-separating moiety can be taken from the exothermic scrubbing reactions as noted in Examples 1 and 2 infra and from low-grade steam from the power plant itself.

In the demonstrated example, $CO_2$ is fed from a cylinder of $CO_2$-bearing gas to a vessel containing an aqueous solution of MEA and potassium carbonate, delivered through a glass tube with glass frit at the submerged terminus. $CO_2$ traveling through the glass frit subsequently bubbles through and dissolves into the reactive solution. After $CO_2$ is dissolves, it reacts with constituents in solution to rapidly form potassium bicarbonate (potassium carbonate, water, and $CO_2$ and the catalyst MEA react to form potassium bicarbonate). As more $CO_2$ is loaded to the solution, more potassium bicarbonate is formed such that the solubility limit of potassium bicarbonate is exceeded in solution (assuming a sufficient initial concentration of dissolved potassium carbonate as described elsewhere) and potassium bicarbonate precipitates from solution in crystalline form. Crystalline potassium bicarbonate precipitate is then removed from the reaction vessel, filtered to separate entrained water from the crystalline solid. The crystalline potassium bicarbonate can then be heated to drive off $CO_2$ and thermally regenerate potassium carbonate. This potassium carbonate can be re-dissolved in potassium carbonate-lean solution of MEA and potassium carbonate in water. This reconstituted scrubbing solution can then be re-exposed to a $CO_2$-bearing stream to again separate $CO_2$. This is a batch demonstration of a process that could be operated in batch or continuous-flow configuration when applied on an industrial scale.

Using the same apparatus, an aqueous solution of MEA is mixed with finely ground $Ca(OH)_2$-bearing waste material. $CO_2$-containing gas is again sparged into the vessel to contact with the aqueous solution/$Ca(OH)_2$-bearing waste material mixture. Dissolved $CO_2$ reacts with $Ca(OH)_2$ in the finely ground waste material through an MEA-catalyzed reaction to form calcium carbonate $CaCO_3$. The waste material containing calcium carbonate (now depleted of $Ca(OH)_2$) is separated from the aqueous MEA solution and disposed of. The MEA solution can then be reloaded with unreacted $Ca(OH)_2$-bearing waste material and again loaded with $CO_2$. As with the previous example, this is also a batch demonstration of a process that could be configured in batch or continuous-flow configuration when applied on an industrial scale.

Eighty grams of potassium carbonate monodemihydrate ($K_2CO_3 \cdot 1.5H_2O$) were dissolved in 100 g of $H_2O$. Monoethylamine (MEA) was added to this solution until the solution was 15 percent (mass percent). The resultant mixture was stirred until homogeneity was achieved (less than one minute) after which approximately 80 mL of the solution were placed in a sparging vessel. For a period of ten min, pure $CO_2$ was loaded into this system with heat generated as $CO_2$ was being loaded. The loading rate was approximately three L/min. With this loading, potassium carbonate ($K_2CO_3$) reacted with amine captured-$CO_2$ (Reaction 8), and with water and $CO_2$, to produce potassium hydrogen carbonate pursuant to Equation 6 supra.

As more $K_2CO_3$ is converted to $KHCO_3$, the solubility of $KHCO_3$ is exceeded as the solubility of $KHCO_3$ is significantly lower than that of $K_2CO3$. White crystalline $KHCO_3$ precipitates and settles to the bottom of the scrubbing vessel. The removal of $CO_2$ from amine reagent as it reacts with potassium carbonate to form potassium hydrogen carbonate effectively regenerates the amine as given in reaction 10 supra.

Subsequent to this reaction, the remaining solution was separated from the resultant mixture, generating a filter cake with 90 percent solid after approximately 30 seconds (sec) of low vacuum (pressure of approx. 635 mm Hg) filter with a one-inch (in) diameter 0.45 micron glass fiber filter. Reactant and product were analyzed using x-ray diffraction crystallography (XRD) as given in FIG. 2. This analysis verified that the reactant was essentially pure $K_2CO_3 \cdot 1.5H_2O$, and the product was essentially pure $KHCO_3$.

Example 2

Once-Through Carbonation of Waste Materials

Reactions similar to those with $NaHCO_3$ and $KHCO_3$ were carried out employing a 20 percent (mass percent) solution of MEA in water and reagent-grade calcium hydroxide ($Ca(OH)_2$) (solubility of 0.185 grams (g)/100 cubic centimeters ($cm^3$) of water at 0° C.). Separately, reactions were carried out with a 20 percent (mass percent) solution of MEA in water and $CaO/Ca(OH)_2$-bearing waste materials such as waste cement or fly ash. (The solubility of calcium oxide is 0.131 g/100 $cm^3$; however, CaO reacts with water and is converted to $Ca(OH)_2$.) The particle sizes ranged between 230 and 200 mesh, 63 and 75 micrometers (μm) respectively.

In a manner similar to that of Example 1 supra, carbon dioxide was loaded for 10 min at a rate of approximately 3 L/min into approximately 80 mL of 20 percent aqueous MEA (mass percent) with the occurrence of mild heat generation. The solids were partially suspended as a result of sparger turbulence, but active mixing was not carried out. The effect is to rapidly convert carbon dioxide to a highly insoluble metal carbonate. The reaction progressed as given in equations 18 through 21 supra. Filtration was done in a similar manner, but for a period of one minute, and product solids were analyzed via XRD.

Nearly complete carbonation of $Ca(OH)_2$ to calcium carbonate can occur after only 15 min of reaction with $CO_2$ loaded 20 percent (mass percent) MEA in water as shown and discussed supra in FIG. 3. Yet another experimental run achieved a high degree (greater than 90%) of conversion of calcium hydroxide in a $CO_2$-loaded MEA/$Ca(OH)_2$ to calcium carbonate within ten min. As mentioned earlier, this high degree of conversion is due to the MEA enhancing the solubility of $CO_2$ in an aqueous MEA solution. Similar success can occur with magnesium hydroxide ($Mg(OH)_2$) and magnesium oxide (MgO). Their solubilities are 0.0009 g/100 $cm^3$ at 18° C. and 0.00062 g/100 $cm^3$, respectively.

A once through phase-separating moiety is placed in an aqueous solution which contains a basic moiety. The basic moiety is chemically regenerated whereas phase-separating moiety is, following reaction with dissolved $CO_2$, removed from the reactive mixture and disposed off. The carbonated phase separating moiety may be a solid metal hydrogen carbonate or a solid metal carbonate.

Chemical regeneration of the basic moiety obviates the need to thermally regenerate the basic moiety, as would be required in typical absorption-based $CO_2$ separation processes employing aqueous solutions of basic moiety.

The temperature range for operation is from about 32° C. to about 100° C.

The $CO_2$ partial pressure can vary from 0 atm to 1.0 atm.

The total pressure can vary from about 1 atm to about 40 atm.

While the invention has been described with reference to details of the illustrated embodiments, these details are not intended to limit the scope of the invention as defined in the appended claims.

The embodiment of the invention in which an exclusive property or privilege is claimed is defined as follows:

1. A method for removing carbon dioxide from a fluid, the method comprising:
   a) forming an aqueous mixture of a phase-separating reactive reagent and a basic moiety;
   b) contacting the fluid to the mixture for a time and at a temperature sufficient to form bicarbonate product;
   c) allow the mixture to become supersaturated with the product; and
   d) separating the product from the mixture as a nonamorphous precipitate.

2. The method as recited in claim 1, wherein the phase-separating reactive reagent is a metal carbonate.

3. The method as recited in claim 2, wherein the metal in the metal carbonate is an alkali selected from group consisting of potassium, sodium, lithium, and combinations thereof.

4. The method recited in claim 1, further comprising:
   e) using the basic moiety to catalyze the regeneration of the phase-separating reactive reagent.

5. The method as recited in claim 4, wherein the mixture is heated.

6. The method as described in claim 5, wherein the product is an alkali bicarbonate in crystalline form.

7. The method as recited in claim 5, wherein the product is an alkali bicarbonate in semi-crystalline form.

8. The method as recited in claim 5, wherein a portion of said product remains suspended in the aqueous mixture.

9. The method as recited in claim 5, further comprising heating the precipitate for a time and at a temperature sufficient to convert the solid to a regenerated phase separating reagent and carbon dioxide gas.

10. The method as recited in claim 9, wherein the regenerated phase separating reagent and said phase separating reagent are the same chemical compound.

11. A method for the removal of carbon dioxide from fluid, the method comprising:

suspending a phase-separating solid agent within an aqueous solution of a basic moiety to create a mixture and;

contacting said mixture with the fluid for a time and at a temperature sufficient to form solid carbonates of the agent.

12. The method as described in claim 11, where the phase-separating solid reactive agent comprises an alkaline earth metal oxide.

13. The method as recited in claim 12, wherein the alkaline earth metal oxide is calcium oxide or magnesium oxide, or combinations thereof.

14. The method as described in claim 11, wherein the phase-separating solid agent comprises an alkaline earth metal hydroxide.

15. The method as recited in claim 11, wherein the phase-separating solid reactive agent has a particle size range from about 1 micron to 2000 microns.

16. The method recited in claim 11, where the basic moiety is an amine or a hindered amine.

17. The method as recited in claim 11, wherein the carbonates include bicarbonates.

18. The method as recited in claim 17, where some portion of the carbonates are insoluble, and where some portion of the bicarbonates comprise solids, and further comprising removing the some portion of the carbonates and the some portion of the bicarbonates from the aqueous solution.

19. The method as recited in claim 11 further comprising chemically regenerating the basic moiety and maintaining the phase-separating solid agent in solid form.

* * * * *